(12) United States Patent
Meric et al.

(10) Patent No.: US 7,284,262 B1
(45) Date of Patent: Oct. 16, 2007

(54) RECEIVER/DECODER AND METHOD OF PROCESSING VIDEO DATA

(75) Inventors: Jerome Meric, Senlis (FR); Patrice Letourneur, Suresnes (FR)

(73) Assignee: Thomson Licensing S.A., Boulogne-Billancourt (FR)

(*) Notice: Subject to any disclaimer, the term of this patent is extended or adjusted under 35 U.S.C. 154(b) by 0 days.

(21) Appl. No.: 09/674,079

(22) PCT Filed: Apr. 29, 1999

(86) PCT No.: PCT/IB99/00850

§ 371 (c)(1),
(2), (4) Date: Oct. 25, 2000

(87) PCT Pub. No.: WO99/56465

PCT Pub. Date: Nov. 4, 1999

(30) Foreign Application Priority Data

Apr. 29, 1998  (EP) ................................. 98401075

(51) Int. Cl.
*H04N 9/64* (2006.01)
*H04N 7/16* (2006.01)
*H04N 7/173* (2006.01)

(52) U.S. Cl. ...................... 725/142; 348/714; 348/715; 348/716; 348/718; 725/134

(58) Field of Classification Search ............ 725/37–38, 725/50, 52, 134, 142; 348/465, 520, 714–716, 348/468, 475, 567, 589, 598; 345/530–574, 345/619, 521, 686, 520; 709/213–216; 369/69, 369/30.01–41.01; 711/100, 110, 113, 140
See application file for complete search history.

(56) References Cited

U.S. PATENT DOCUMENTS

| | | | | |
|---|---|---|---|---|
| 4,862,154 A | | 8/1989 | Gonzalez-Lopez | 340/747 |
| 5,274,753 A | * | 12/1993 | Roskowski et al. | 345/546 |
| 5,386,233 A | * | 1/1995 | Keith | 375/240.07 |
| 5,517,612 A | * | 5/1996 | Dwin et al. | 345/502 |
| 5,519,450 A | * | 5/1996 | Urbanus et al. | 348/600 |
| 5,559,549 A | * | 9/1996 | Hendricks et al. | 725/50 |
| 5,570,126 A | * | 10/1996 | Blahut et al. | 725/93 |
| 5,594,467 A | | 1/1997 | Marlton et al. | 345/115 |
| 5,611,041 A | * | 3/1997 | Bril et al. | 345/558 |
| 5,640,502 A | * | 6/1997 | Knox et al. | 345/554 |
| 5,642,498 A | * | 6/1997 | Kutner | 345/547 |
| 5,781,687 A | * | 7/1998 | Parks | 386/52 |
| 5,801,782 A | | 9/1998 | Patterson | 348/473 |
| 5,825,371 A | * | 10/1998 | Shirakawa | 345/501 |
| 5,835,156 A | * | 11/1998 | Blonstein et al. | 725/38 |

(Continued)

FOREIGN PATENT DOCUMENTS

EP         0 384 257 A2    8/1990

(Continued)

*Primary Examiner*—Andrew Y. Koenig
*Assistant Examiner*—Michael W. Hoye
(74) *Attorney, Agent, or Firm*—Osha Liang LLP

(57) ABSTRACT

A method of processing video data in a receiver/decoder including at least one port (31) for receiving data and memory means (40) including a data buffer area ($45A^0$, $45A^1$) for storing incoming data for display, and a graphics buffer area ($45A^i$) for storing graphics data, said method including passing graphics data stored in the graphics buffer area to the data buffer area for combination with display data stored therein.

22 Claims, 6 Drawing Sheets

U.S. PATENT DOCUMENTS

| | | | |
|---|---|---|---|
| 5,896,140 A * | 4/1999 | O'Sullivan | 345/536 |
| 5,943,065 A * | 8/1999 | Yassaie et al. | 345/546 |
| 6,031,577 A * | 2/2000 | Ozkan et al. | 348/465 |
| 6,091,431 A * | 7/2000 | Saxena et al. | 345/535 |
| 6,593,937 B2 * | 7/2003 | Ludtke et al. | 345/629 |
| 7,068,280 B1 * | 6/2006 | McKee Cooper et al. | 345/530 |

FOREIGN PATENT DOCUMENTS

| | | | |
|---|---|---|---|
| EP | 0 484 981 A2 | 5/1992 | |
| EP | 0 575 149 A2 | 12/1993 | |
| EP | 0 752 695 A2 | 1/1997 | |
| EP | 752695 A2 * | 1/1997 | |
| EP | 0 766 463 A2 | 4/1997 | |
| EP | 0 802 519 A1 | 10/1997 | |
| EP | 802519 A1 * | 10/1997 | |

* cited by examiner

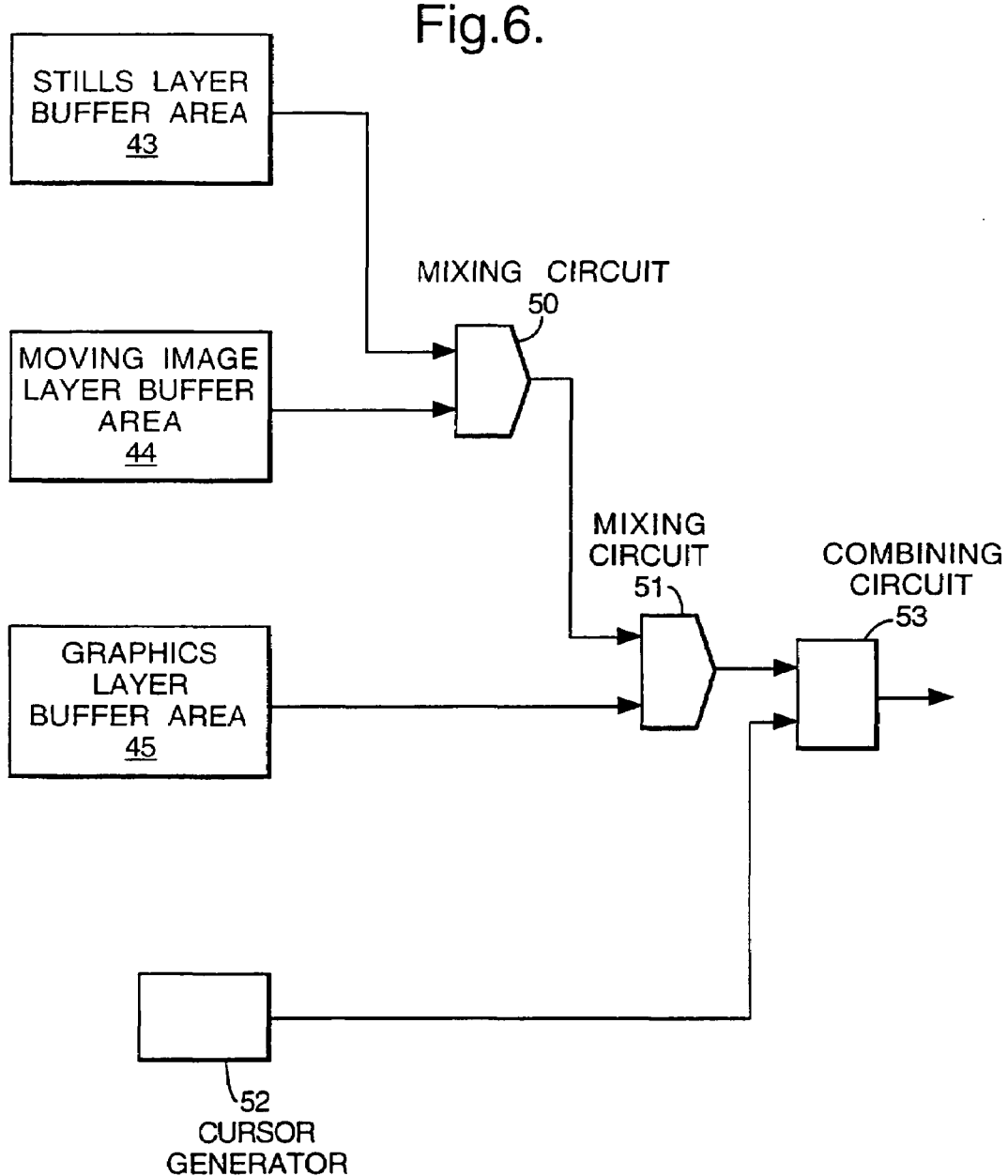

RECEIVER/DECODER AND METHOD OF PROCESSING VIDEO DATA

The present invention relates to a receiver/decoder and a method of processing video data.

The term "receiver/decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser, a video recorder, or a television.

In a broadcast digital television system, received signals are passed to a receiver/decoder and thence to a television set. As used herein, the term "digital television system" includes for example any satellite, terrestrial, cable and other system. The receiver/decoder decodes a compressed MPEG-type signal into a television signal for the television set. It is controlled by a remote controller handset, through an interface in the receiver/decoder. The receiver/decoder is used to process the incoming bit stream, and includes a variety of application modules which cause the receiver/decoder to perform a variety of control and other functions.

Such a receiver/decoder may have a variety of devices coupled to it, such as a card reader for the user to pass an authorization card through to confirm which services the user is authorized to use, a hand-held television receiver control wand, a television display unit, and a second card reader for use with bank cards to allow the user to perform home banking functions. It may also have a variety of ports coupled to it, for example, a modem for access to the Internet and for conducting home banking transactions.

The receiver/decoder typically includes a buffering arrangement for handling incoming data. The basic principle of buffering in a receiver/decoder is that a memory section in a memory is designated as a buffer. Incoming data from a port is fed into the buffer. The buffer size may be chosen to be large enough to accommodate most or all incoming messages, or the buffer may be operated with two pointers, one for the point where fresh incoming data is written into the buffer and the other for the point where stored data is read from the buffer.

The receiver/decoder normally includes a 4-layer structure for generating the image to be displayed on the television set, the 4 layers being a stills layer, a moving image layer, a graphics layer, and a cursor layer. The graphics layer is preferably utilized for both icons (typically geometric shapes) and titles (usually but not always subtitles). The use of a common layer, the graphics layer, for both icons and titles causes difficulties in maintaining and updating both the icons and the titles satisfactorily, particularly as a title can appear at any position on the screen.

The main aim of the present invention is to provide an improved buffering arrangement in a receiver/decoder to solve this and other problems.

The present invention provides a method of processing video data in a receiver/decoder comprising at least one port for receiving data and memory means comprising a data buffer area for storing incoming data for display, and a graphics buffer area for storing graphics data, said method comprising passing graphics data stored in the graphics buffer area to the data buffer area for combination with display data stored therein.

In a preferred embodiment, the incoming data comprises video text data, such as one or more subtitles, and the graphics data comprises icon data. When a subtitle screen has been fully received in the data buffer area, a central processing unit in the receiver/decoder, under the control of a device, passes icon data into the data buffer area, preferably just before the data stored in the data buffer area is combined with other data to provide video data. Hence, the invention affords the advantage that in the event of an overlap between the icon and part of the subtitle, the icon can be laid over that part of the subtitle, but the non-overlapped parts can be concurrently displayed with the icon.

In a preferred embodiment, the data buffer area comprises two data buffer sub-areas, said incoming display data being directed into one of said sub-areas at a time.

The two sub-areas may be interchanged so that further incoming display data is stored in the other sub-area and graphics data stored in the graphics buffer area is passed to the other sub-area. This can enable a subtitle screen to be stored in one sub-area whilst a previously received subtitle screen is being output from another sub-area, thereby avoiding over-writing of the previously received subtitle screen with fresh data.

Preferably, the two sub-areas are interchanged immediately after graphics data stored in the graphics buffer area is passed to one of the data buffer sub-areas.

The graphics buffer area may comprise a plurality of graphics buffer sub-areas in which graphics data can be stored, graphics data being passed to the data buffer area from a selected one of the graphics buffer sub-areas. This can enable, for example, a number of different icons to be generated and stored prior to the reception of any video text data, so that there is no need for icon generating means to generate continuously icon data.

Preferably, the combined graphics and display data is further combined with other received data to provide video data. Thus, whilst further incoming display data is being stored in one data buffer sub-area and graphics data stored in the graphics buffer area is being passed to that data buffer sub-area, the combined data of the other data buffer sub-area can be further combined with the other received data, again thereby avoiding over-writing of the previously received subtitle screen with fresh data.

Preferably, graphics data stored in the graphics buffer area is passed into the data buffer area for combination with display data stored therein immediately before the thus combined graphics and display data is combined with said other received data.

The video data may comprise four layers of data, said combined graphics and display data comprising one of said layers. If so, the four layers of data may comprise said combined graphics and display data layer, a stills data layer, a moving image data layer, and a cursor data layer.

The moving image data layer and the display data may comprise at least part of an MPEG datastream.

The present invention also provides a receiver/decoder comprising at least one port for receiving data, memory means comprising a data buffer area for storing incoming data for display and a graphics buffer area for storing graphics data, and means for passing graphics data stored in the graphics buffer area to the data buffer area for combination with display data stored therein.

A preferred embodiment of the receiver/decoder comprises at least one port for receiving data, a memory comprising a data buffer area for storing incoming data for display and a graphics buffer area for storing graphics data, and a processor for passing graphics data stored in the graphics buffer area to the data buffer area for combination with display data stored therein.

The data buffer area may comprise two data buffer sub-areas, and the receiver/decoder may further comprise means, for example, a microprocessor, for directing incoming data into one of said sub-areas.

The receiver/decoder may further comprise control means, such as, for example, a device, the directing means being arranged to direct incoming display data to one of the data buffer sub-areas as specified by said control means.

The receiver/decoder may further comprise means, for example, a device, for interchanging the two sub-areas so that further incoming display data is storable in the other sub-area and graphics data stored in the graphics buffer area is passable to the other sub-area.

The interchanging means may be adapted to interchange the two data buffer sub-areas immediately after graphics data stored in the graphics buffer area is passed to one of the data buffer sub-areas.

The graphics buffer area may comprise a plurality of graphics buffer sub-areas in which graphics data is storable, graphics data being passable to the data buffer area from a selected one of the graphics buffer sub-areas.

The receiver/decoder may further comprise means for combining the combined graphics and display data with other received data to provide video data. IN one preferred embodiment, the combining means is a mixing circuit.

The passing means may be arranged to pass graphics data stored in the graphics buffer area into the data buffer area for combination with display data stored therein immediately before combining means combines the combined graphics and display data with said other received data.

The receiver/decoder may further comprise buffer control means, such as, for example, a device, the data buffer sub-areas being defined by the buffer control means.

The present invention also extends to a broadcast and reception system including a receiver/decoder as aforementioned, and means for broadcasting said data. In a preferred embodiment, the system is a digital television system.

Various functions of the receiver/decoder may be implemented in hardware, for example in a dedicated integrated circuit; this may provide enhanced speed of operation. Preferably, however, at least some of the functions are implemented in software, preferably implemented by processing means which runs the applications; this can allow greater flexibility, require less components, and allow the receiver/decoder to be updated more readily.

Receiver/decoders embodying the invention will now be described, by way of example, with reference to the drawings, in which:

FIG. 6 is a schematic diagram illustrating the combination of layers of a video display.

Figure 1:
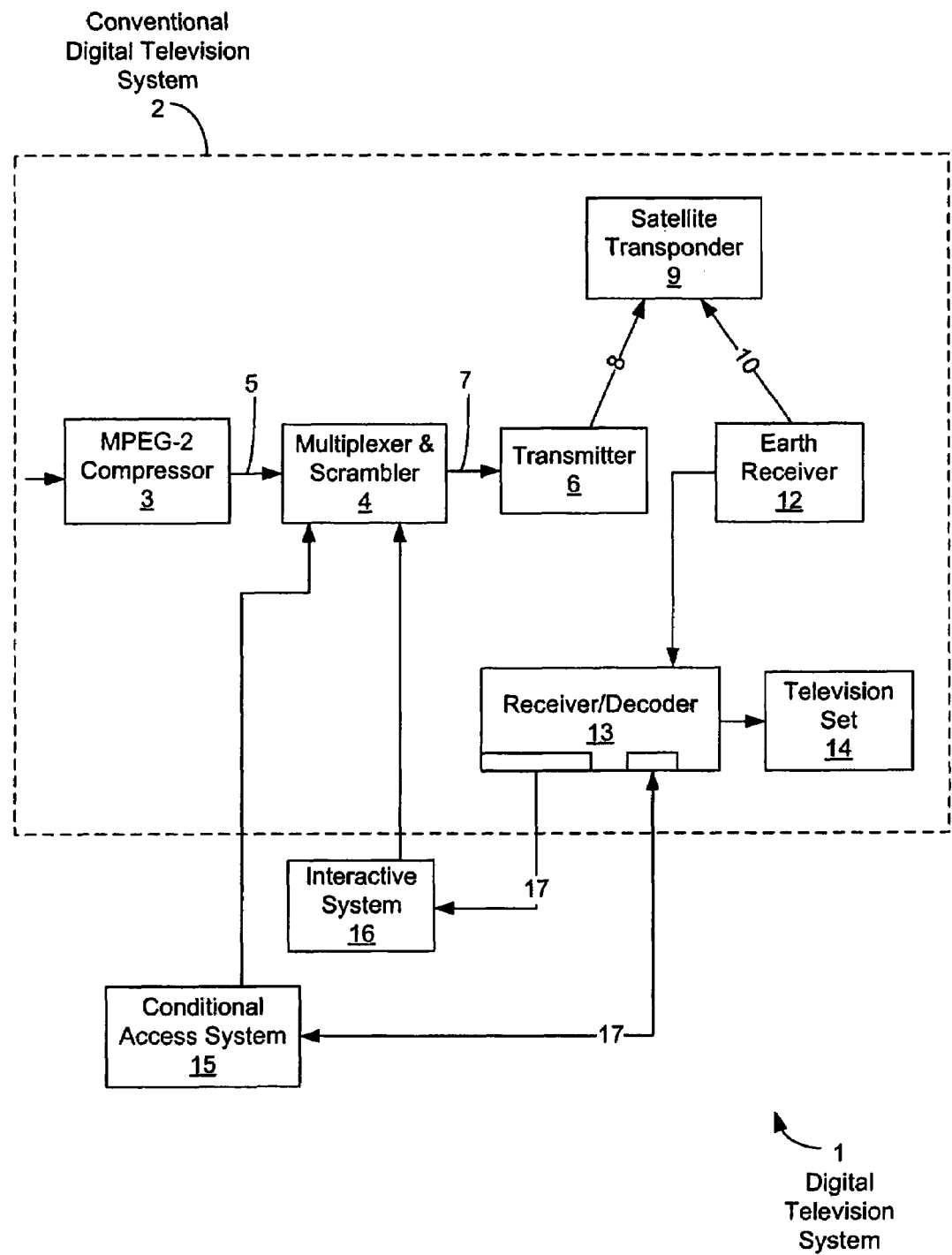
FIG. 1 is a schematic diagram of a digital television system.

An overview of a digital television system 1 is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14.

Other transport channels for transmission of the data are of course possible, such as terrestrial broadcast, cable transmission, combined satellite/cable links, telephone networks etc.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 13 having access to an equivalent to the exploitation key stored on a smart card inserted in the decoder to decrypt the encrypted control word and thereafter descramble the transmitted data. A paid-up subscriber will receive, for example, in a broadcast monthly ECM (Entitlement Control Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the decoder, enables the end user to interact with various applications via a modern back channel 17. The modem back channel may also be used for communications used in the conditional access system 15. An interactive system may be used, for example, to enable the viewer to communicate immediately with the transmission centre to demand authorisation to watch a particular event, download an application etc.

Figure 2:
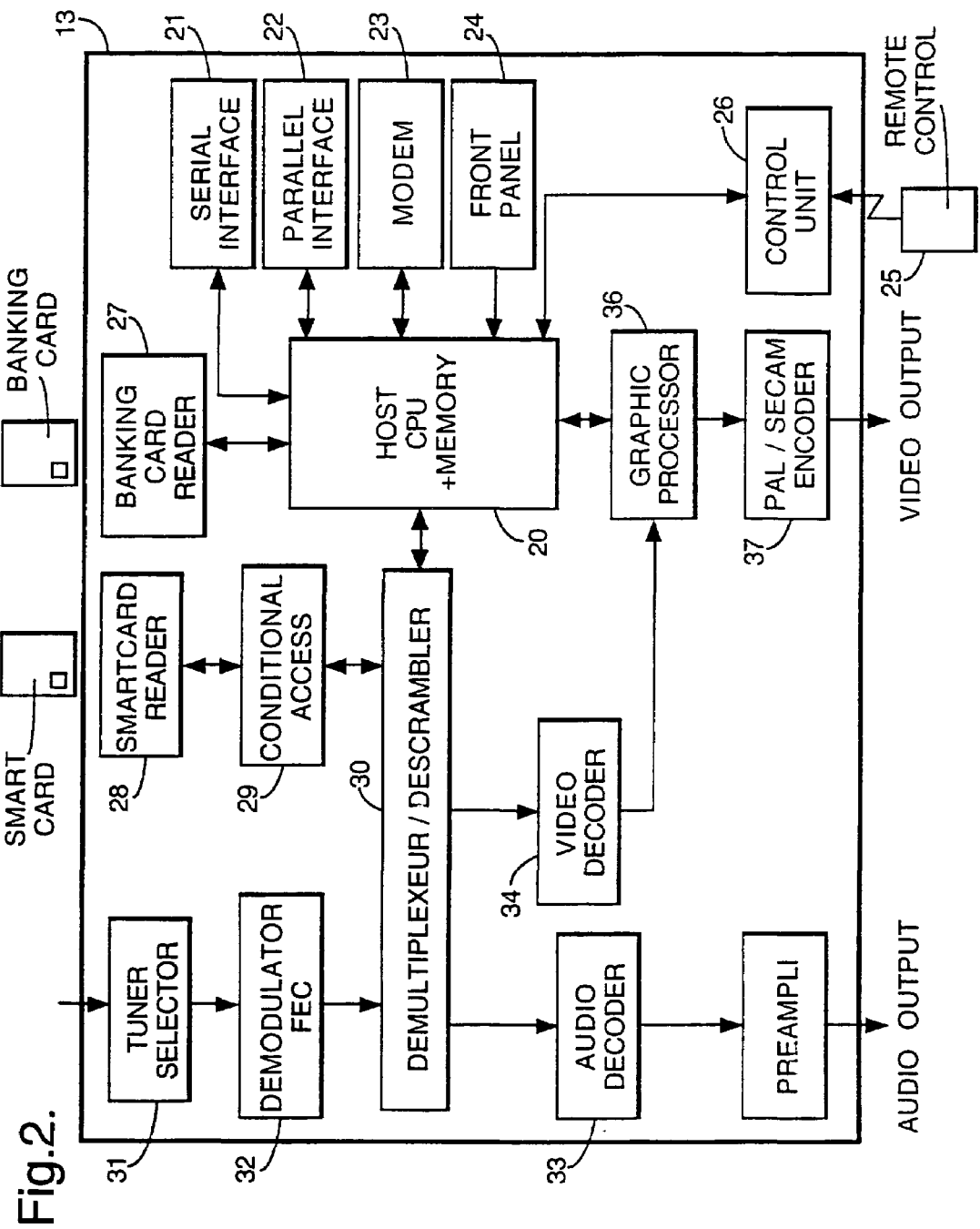
FIG. 2 is a schematic diagram of the structure of a receiver/decoder of the system of FIG. 1.

Referring to FIG. 2, the elements of the receiver/decoder 13 or set-top box will now be described. The elements shown in this figure will be described in terms of functional blocks.

The decoder 13 comprises a central processor 20 including associated memory elements and adapted to receive input data from a serial interface 21, a parallel interface 22, a modem 23 (connected to the modem back channel 17 of FIG. 1), and switch contacts 24 on the front panel of the decoder.

The decoder is additionally adapted to receive inputs from an infra-red remote control 25 via a control unit 26 and also possesses two smartcard readers 27, 28 adapted to read bank or subscription smartcards 29, 30 respectively. The subscription smartcard reader 28 engages with an inserted subscription card 30 and with a conditional access unit 29 to supply the necessary control word to a demultiplexer/descrambler 30 to enable the encrypted broadcast signal to be descrambled. The decoder also includes a conventional tuner 31 and demodulator 32 to receive and demodulate the satellite transmission before being filtered and demultiplexed by the unit 30.

Figure 3:
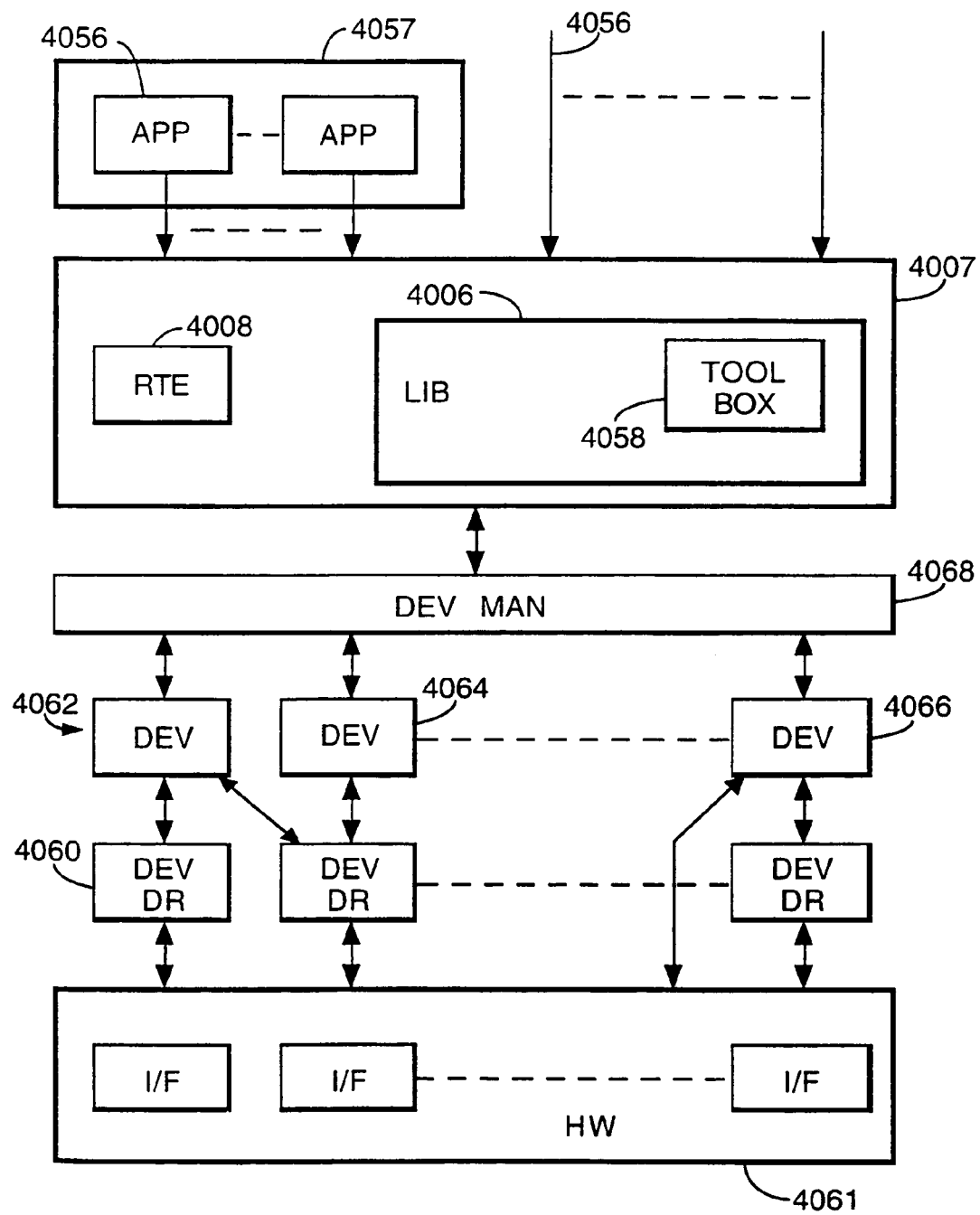
FIG. 3 is a functional block diagram of the layered architecture of the receiver/decoder.

Processing of data within the decoder is generally handled by the central processor 20. FIG. 3 illustrates the software architecture of the central processor 20 of the receiver/decoder. With reference to FIG. 3, the software architecture comprises a Run-Time-Engine 4008, a Device Manager 4068 and a plurality of Devices 4062 and Device Drivers 4066 for running one or more applications 4056.

As used in this description, an application is a piece of computer code for controlling high level functions of preferably the receiver/decoder 13. For example, when the end user positions the focus of remote control 25 on a button object seen on the screen of the television set 14 and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 13, or broadcast and downloaded into the RAM or FLASH memory of the receiver/decoder 13.

Applications are stored in memory locations in the receiver/decoder 13 and represented as resource files. The resource files comprise graphic object description unit files, variables block unit files, instruction sequence files, application files and data files, as described in more detail in the above-mentioned patent specifications.

The receiver/decoder contains memory divided into a RAM volume, a FLASH volume and a ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

The central processor 20 can be regarded as centred on a run time engine 4008 forming part of a virtual machine 4007. This is coupled to applications on one side (the "high level" side), and, on the other side (the "low level" side), via various intermediate logical units discussed below, to the receiver/decoder hardware 4061, comprising the various ports as discussed above (that is, for example, the serial interface 21, the parallel interface 22, modem 23, and control unit 26).

With specific reference to FIG. 3, various applications 4057 are coupled to the virtual machine 4007; some of the more commonly used applications may be more or less permanently resident in the system, as indicated at 4057, while others will be downloaded into the system, eg from the MPEG data stream or from other ports as required.

The virtual machine 4007 includes, in addition to the run time engine 4008, some resident library functions 4006 which include a toolbox 4058. The library contains miscellaneous functions in C language used by the engine 4008. These include data manipulation such as compression, expansion or comparison of data structures, line drawing, etc. The library 4006 also includes information about firmware in the receiver/decoder 13, such as hardware and software version numbers and available RAM space, and a function used when downloading a new device 4062. Functions can be downloaded into the library, being stored in FLASH or RAM memory.

The run time engine 4008 is coupled to a device manager 4068 which is coupled to a set of devices 4062 which are coupled to device drivers 4060 which are in turn coupled to the ports or interfaces. In broad terms, a device driver can be regarded as defining a logical interface, so that two different device drivers may be coupled to a common physical port. A device will normally be coupled to more than one device driver; if a device is coupled to a single device driver, the device will normally be designed to incorporate the full functionality required for communication, so that the need for a separate device driver is obviated. Certain devices may communicate among themselves.

As will be described below, there are 3 forms of communication from the devices 4064 up to the run time engine: by means of variables, buffers, and events which are passed to a set of event queues.

Each function of the receiver/decoder 13 is represented as a device 4062 in the software architecture of the receiver/decoder 13. Devices can be either local or remote. Local devices 4064 include smartcards, SCART connector signals, modems, serial and parallel interfaces, a MPEG video and audio player and an MPEG section and table extractor. Remote devices 4066, executed in a remote location, differ from local devices in that a port and procedure must be defined by the system authority or designer, rather than by a device and device driver provided and designed by the receiver/decoder manufacturer.

The run time engine 4008 runs under the control of a microprocessor and a common application programming interface. They are installed in every receiver/decoder 13 so that all receiver/decoders 13 are identical from the application point of view.

The engine 4008 runs applications 4056 on the receiver/decoder 13. It executes interactive applications 4056 and receives events from outside the receiver/decoder 13, displays graphics and text, calls devices for services and uses functions of the library 4006 connected to the engine 4008 for specific computation.

The run time engine 4008 is an executable code installed in each receiver/decoder 13, and includes an interpreter for interpreting and running applications. The engine 4008 is adaptable to any operating system, including a single task operating system (such as MS-DOS). The engine 4008 is based on process sequencer units (which take various events such as a key press, to carry out various actions), and contains its own scheduler to manage event queues from the different hardware interfaces. It also handles the display of graphics and text. A process sequencer unit comprises a set of action-groups. Each event causes the process sequencer unit to move from its current action-group to another action-group in dependence on the character of the event, and to execute the actions of the new action-group.

The engine 4008 comprises a code loader to load and download applications 4056 into the receiver/decoder memory. Only the necessary code is loaded into the RAM or FLASH memory, in order to ensure optimal use. The downloaded data is verified by an authentication mechanism to prevent any modification of an application 4056 or the execution of any unauthorized application. The engine 4008 further comprises a decompressor. As the application code (a form of intermediate code) is compressed for space saving and fast downloading from the MPEG stream or via a built-in receiver/decoder mode, the code must be decompressed before loading it into the RAM. The engine 4008 also comprises an interpreter to interpret the application code to update various variable values and determine status changes, and an error checker.

Before using the services of any device 4062, a program (such as an application instruction sequence) has to be declared as a "client", that is, a logical access-way to the device 4062 or the device manager 4068. The manager gives the client a client number which is referred to in all accesses to the device. A device 4062 can have several clients, the number of clients for each device 4062 being specified depending on the type of device 4062. A client is introduced to the device 4062 by a procedure "Device: Open Channel". This procedure assigns a client number to the client. A client can be taken out of the device manager 4068 client list by a procedure "Device: Close Channel".

The access to devices 4062 provided by the device manager 4068 can be either synchronous or asynchronous. For synchronous access, a procedure "Device: Call" is used. This is a means of accessing data which is immediately available or a functionality which does not involve waiting for the desired response. For asynchronous access, a procedure "Device: I/O" is used. This is a means of accessing data which involves waiting for a response, for example scanning tuner frequencies to find a multiplex or getting back a table from the MPEG stream. When the requested result is available, an event is put in the queue of the engine to signal its arrival. A further procedure "Device: Event" provides a means of managing unexpected events.

As noted above, the main loop of the run time engine is coupled to a variety of process sequencer units, and when the main loop encounters an appropriate event, control is temporarily transferred to one of the process sequencer units.

Thus, it can be seen that the central processor 20 provides a platform having considerable flexibility in enabling an application to communicate with a variety of devices.

In the case of received audio and video signals, the MPEG packets containing these signals will be demultiplexed and filtered so as to pass real time audio and video data in the form of a packetised elementary stream (PES) of audio and visual data to dedicated audio and video processors or decoders 33, 34. The converted output from the audio processor 33 passes to a preamplifier 35 and thereafter via the audio output of the receiver/decoder. The converted output from the video processor 34 passes via a graphic processor 36 and PAL/SECAM encoder 37 to the video output of the receiver/decoder.

With reference to FIG. 2, the graphic processor 36 is preferably designed to generate a screen display combining moving images together with overlaid text or other images. More specifically it can combine 4 layers; a stills layer, a moving image layer, a graphics layer, and a cursor layer. As described in more detail below, the graphic processor 36 additionally receives graphic data for display (such as generated images etc) from the central processor 20 and combines this information with information received from the video processor 34 to generate the screen display.

Figure 4:
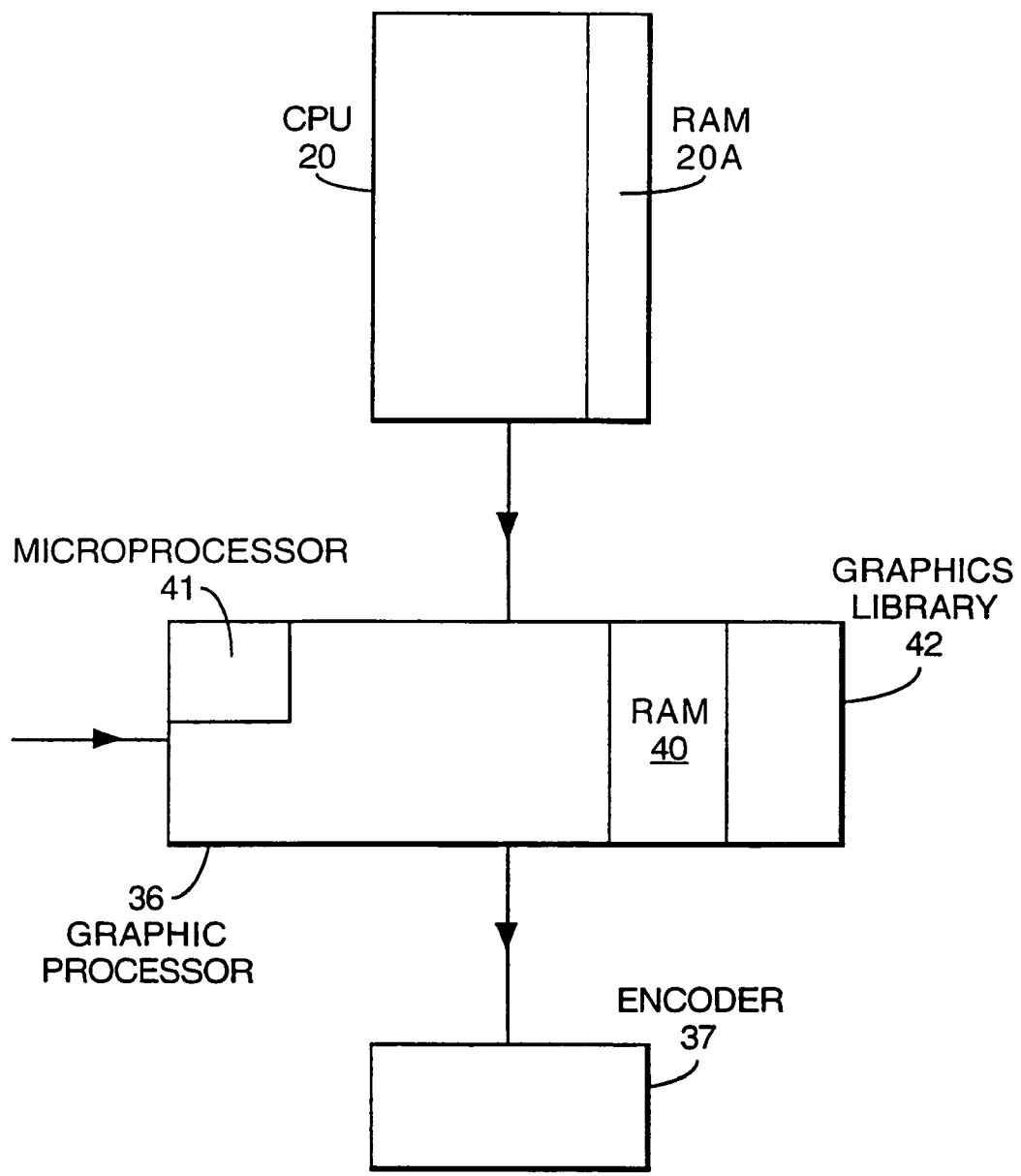
FIG. 4 is a schematic diagram of the arrangement of the graphic processor of the receiver/decoder.
Figure 5:
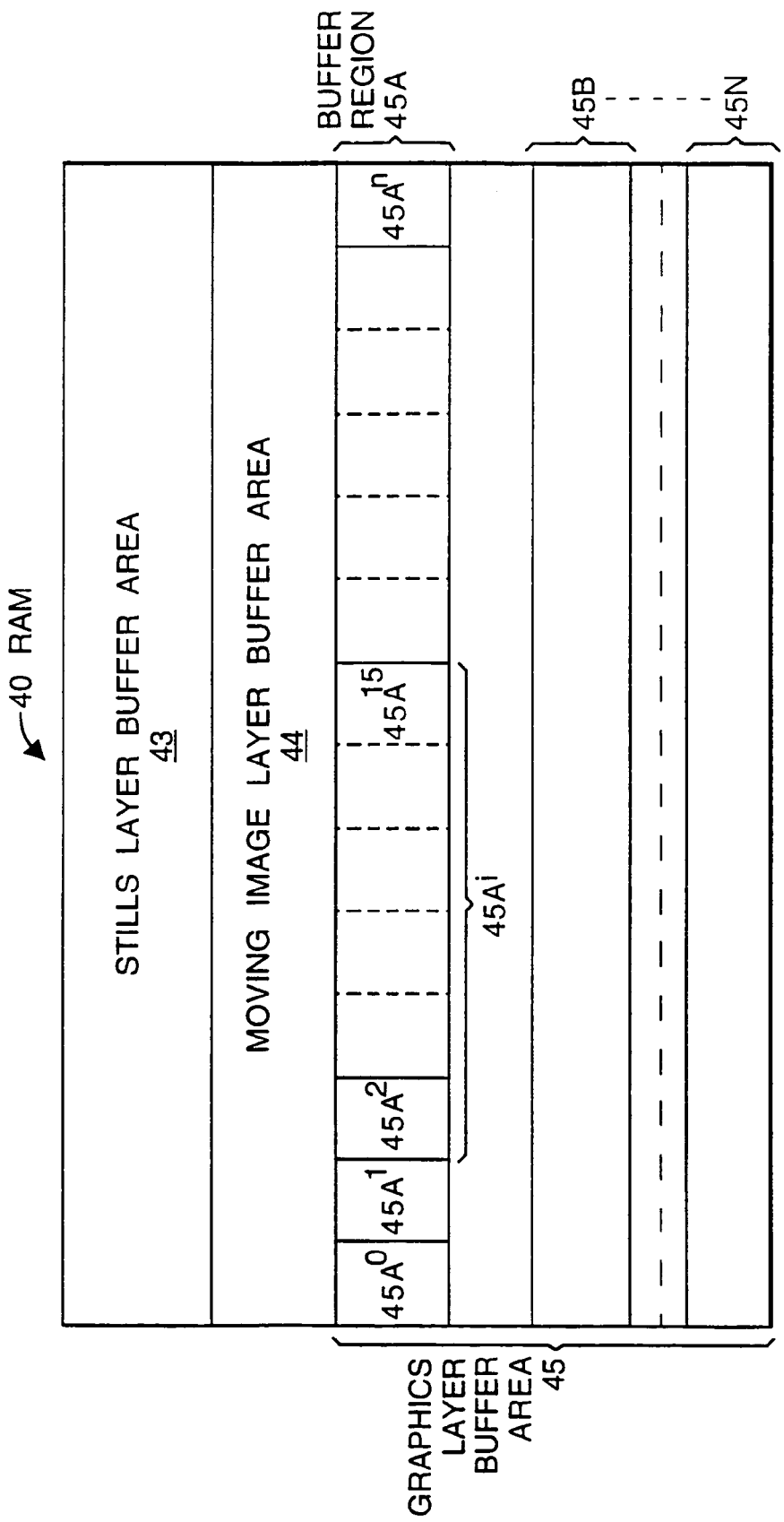
FIG. 5 is a schematic diagram of a RAM memory of the graphic processor.

As shown in more detail in FIG. 4, the graphic processor 36 includes dedicated RAM memory area 40, dedicated microprocessor 41 and graphics library 42. With reference to FIG. 5, the RAM memory area 40 of the graphic processor 36 is divided into a number of buffer areas; a stills layer buffer area 43, a moving image layer buffer area 44 and a graphics layer buffer area 45.

The stills layer is used for background images of a broadly static nature. The circuitry and software associated with the stills layer buffer area 43 can preferably generate an image therein by any desired combination of the following processes:

generating and filling rectangles with specific colours (defined by up to 24 bits);
copying images received from the MPEG data stream;
repeating an image occupying less than the full screen area, to produce a wallpaper effect.

The moving image layer is used for the incoming video signals obtained from the MPEG data stream. The circuitry and software associated with the moving image layer buffer area 44 can preferably resize and scale the incoming images, and combine images from a plurality of sources into different areas of the buffer area.

The graphics layer is used to produce titles and icons (graphics). Titles are frequently subtitles, which appear centred near the lower edge of the image, but may also appear in other positions on the image. Icons are generally geometric shapes such as rectangles, circles, buttons, and dialogue boxes (it will be realized that the term "icon" is here being used in a broad sense).

The graphics layer is defined by one or more rectangular regions, each rectangular region being defined by the coordinates of the upper left corner of the region and the size of the region. Accordingly, the graphics layer buffer area 45 is sub-divided into a plurality of buffer regions 45A, 45B, . . . 45N, one buffer region for each of the rectangular regions of the graphics layer. Each buffer region 45A . . . comprises a plurality of sub-areas $45A^0$, $45A^1$ . . . $45A^n$. Each buffer region is created by a "subtitle" device 4062, under the control of an application 4056, in the central processor 20 using a command procedure stored in the graphics library 42.

With reference to FIG. 6, the contents of the stills layer buffer area 43 and the moving image layer buffer area 44, as they are read out, are mixed together by a mixing circuit 50 which can be set to blend (alpha blending, that is, translucently) those outputs; and the output of that mixing circuit 50 is combined with the contents of the graphics layer buffer area 45, as those contents are read out, by a similar mixing circuit 51.

The output of that mixing circuit is combined with the output of a hardware cursor generator 52 by a combining circuit 53 which superposes a cursor signal on the combination of the first 3 layers. The cursor layer is preferably superposed opaquely, that is, without the option of blending, on the combination of the first 3 layers, so that the combination of the first 3 layers is wholly obscured within the area of the cursor. However, one of the bit values available for the cursor pixels is preferably "transparent", so that the cursor can effectively have "holes" in it through which the underlying combined image from the first 3 layers can be seen.

This 4-layer structure produces potential problems with respect to the third layer, that is, the graphics layer. These problems arise because two separate types of display element, titles and icons, are being generated in the same layer. There is therefore the possibility of conflict between these two types of display element. For example, it will often be desirable to change the titles and the icons at different times (and often it will be desirable for the icons to remain in place for longer than the titles). As noted above, the fact that titles may appear in any position on the display, rather than solely in the standard subtitle position, means that such possibility of conflict is substantial.

To overcome this problem, each buffer region $45A$, $45B$ . . . includes two buffer sub-areas $45A^0$ and $45A^1$ which are reserved for use by the subtitle device 4062 to build and display subtitles.

The subtitle device 4062 in the central processor 20 selects which of the two buffer sub-areas $45A^0$ and $45A^1$ is to be used to receive incoming data for display and outputs an appropriate command to the graphic processor 36. In turn, the microprocessor 41 of the graphic processor 36 directs incoming data to the selected buffer sub-area. For this purpose, the two buffer sub-areas $45A^0$ and $45A^1$ are treated as a "working buffer" and a "display buffer". The sub-area into which currently incoming data is fed is the working buffer, so its contents will be changing.

The received data (subtitles) is directed into the two buffers sub-areas $45A^0$ and $45A^1$ alternately. In other words, the subtitle device 4062 reverses the roles of the two sub-areas each time the working buffer has a new complete subtitle page to display, as the contents of that sub-area are no longer changing, giving a steady image which is acceptable to the viewer so that sub-area can be used as the display buffer. The contents of the display buffer are read out as the graphics layer for combination with the combined stills layer and moving image layer. The interval between the interchange of the roles of the two sub-areas $45A^0$ and $45A^1$, that is, between the interchange of the working and display buffers, is typically 5 to 10 s. At that point, the subtitle device 4062 in the central processor 20 outputs an appropriate command to the graphic processor 36 to interchange the roles of the two sub-areas $45A^0$ and $45A^1$, and, in turn, the microprocessor 41 of the graphic processor 36 clears the contents of the other sub-area and directs incoming data to that sub-area.

Each buffer region $45A$, $45B$ . . . includes a further buffer area, namely an icon buffer area $45A^i$, $45B^i$ . . . , as shown in FIG. 5. Each icon buffer area $45A^i$ comprises one or more icon buffer sub-areas, $45A^2$, $45A^3$ . . . up to $45A^{15}$. Each icon buffer sub-area contains respective icon image data. The icon image may be generated by software stored in the central processor 20, stored in the RAM area 20A (or FLASH memory area) of the central processor 20 and copied by the central processor 20 into a designated icon buffer sub-area of the RAM area 41 of the graphic processor 36. Once an icon image has been stored in the graphic processor 36, it remains in its buffer sub-area and can be copied repeatedly to either of the two buffer sub-areas $45A^0$ and $45A^1$ whenever required. In this way, a whole series of icon images can be constructed, which can be used in whatever sequences and at whatever times are required.

The combination of the two images, the subtitles image in one or other of the buffer sub-areas $45A^0$ and $45A^1$ and the icon image in the icon buffer area $45A^i$, is achieved by copying the icon image into the working buffer, that is, into whichever of the two sub-areas $45A^0$ and $45A^1$ is not currently the display buffer. As specified by the controlling application, the subtitle device 4062 outputs an appropriate command to the graphic processor 36 to copy the contents of a specified icon buffer sub-area to the working buffer just before the working buffer is to become the display buffer, that is, when a complete subtitle page has been stored in the working buffer. With the above arrangement, the icon image currently being displayed is stored in the display buffer, the next icon image to be displayed may already be stored in the working buffer, and a fresh icon image may be under construction by the icon generator while the working buffer is receiving subtitles data. This arrangement requires synchronism between the interchanging of the working and adjacent play buffers and the construction of fresh icon images.

At any time, the application controlling the subtitle device 4062 may require the currently displayed icon image to be changed without alteration of the displayed subtitle, for example, upon input of a command from the remote control 25. In this case, the subtitle device 4062 outputs a command to the graphic processor 36 to copy an icon image stored in the icon buffer area immediately into the display buffer over the icon image already stored therein.

In summary, when a subtitle screen has been fully received in the data buffer area, a central processing unit in the receiver/decoder, under the control of a device, passes icon data into the data buffer area, preferably just before the data stored in the data buffer area is combined with other data to provide video data. Hence, in the event of an overlap between the icon and part of the subtitle, the icon can be laid over that part of the subtitle, but the non-overlapped parts can be concurrently displayed with the icon.

The precise details of the implementation of the various functions described above, and their distribution between hardware and software, are a matter of choice for the implementor and will not be described in detail. It is, however, noted that dedicated integrated circuits capable of performing the operations required in the receiver/decoder are commercially available or can be readily designed, and these can be used as the basis for a hardware accelerator, or more preferably modified to produce a dedicated hardware accelerator, to implement various of the operations required, thereby reducing the processing power required to run the software. However, the operations required may be implemented in software if sufficient processing power is available.

The modules and other components have been described in terms of the features and functions provided by each component, together with optional and preferable features. With the information given and specifications provided, actual implementation of these features and the precise details are left to the implementor. As an example, certain modules could be implemented in software, preferably written in the C programming language and preferably compiled to run on the processor used to run the application; however, some components may be run on a separate processor, and some or all components may be implemented by dedicated hardware.

The above modules and components are merely illustrative, and the invention may be implemented in a variety of ways, and, in particular, some components may be combined with others which perform similar functions, or some may be omitted in simplified implementations. Hardware and software implementations of each of the functions may be freely mixed, both between components and within a single component.

It will be readily understood that the functions performed by the hardware, the computer software, and such like are performed on or using electrical and like signals. Software implementations may be stored in ROM, or may be patched in FLASH.

It will be understood that the present invention has been described above purely by way of example, and modifications of detail can be made within the scope of the invention. Each feature disclosed in the description, and (where appropriate) the claims and drawings may be provided independently or in any appropriate combination.

The invention claimed is:

1. A method for processing video data in a receiver/decoder comprising:
   designating a first buffer sub-area as a display buffer;
   designating a second buffer sub-area as a working buffer, wherein the working buffer is initially reserved only for incoming subtitle data comprising at least one subtitle, and wherein a content of the working buffer is constantly changing;
   storing subtitle data in the working buffer to obtain a complete subtitle page;
   storing graphics data in a third buffer sub-area; and
   copying the graphics data from the third buffer sub-area into the working buffer after obtaining the complete subtitle page to obtain a complete image;
   interchanging roles of the working buffer and the display buffer such that the complete image is transferred from the working buffer to the display buffer; and
   displaying the complete subtitle page,
   wherein the graphics data is copied into the working buffer just before the working buffer becomes the display buffer,
   wherein the complete image comprises both the complete subtitle page and the graphics data, and
   wherein the first buffer sub-area, the second buffer sub-area, and the third buffer sub-area are distinct buffer sub-areas located in a graphics buffer region.

2. The method of claim 1, wherein the third buffer sub-area comprises a plurality of icon buffer sub-areas.

3. The method of claim 2, wherein graphics data is stored in any one of the plurality of icon buffer sub-areas.

4. The method of claim 1, wherein interchanging the roles of the working buffer and the display buffer occurs at a specific time interval.

5. The method of claim 4, wherein the specific time interval is in the range of 5-10 seconds.

6. The method of claim 1, wherein displaying the complete image comprises displaying graphics data over the subtitle data for overlapping portions of graphics data and subtitle data.

7. The method of claim 1, wherein displaying the complete image comprises displaying non-overlapping portions of graphics data and subtitle data concurrently.

8. The method of claim 1, wherein other received data to be displayed as the complete image is copied into the working buffer immediately after copying the graphics data into the working buffer.

9. The method of claim 1, wherein the complete image comprises a graphics layer comprising the graphics data and the subtitle data, a stills data layer, a moving image data layer, and a cursor data layer.

10. The method of claim 9, wherein the moving image data layer and the subtitle data comprise at least part of an MPEG datastream.

11. The method of claim 1, wherein graphics data comprises icon data.

12. An apparatus for processing video data in a receiver/decoder comprising:
    a first buffer sub-area initially designated as a display buffer and configured to store subtitle data in a complete subtitle page, wherein subtitle data comprises at least one subtitle;
    a second buffer sub-area initially designated as a working buffer, wherein the working buffer is initially reserved only for incoming subtitle data, and wherein a content of the working buffer is constantly changing; and
    a third buffer sub-area configured to store graphics data,
    wherein the receiver/decoder is configured to:
       copy the graphics data from the third buffer sub-area into the working buffer after obtaining the complete subtitle page to obtain a complete image;
       interchange roles of the working buffer and the display buffer such that the complete image is transferred from the working buffer to the display buffer; and
       display the complete image, wherein the complete image comprises the complete subtitle page and the graphics data,
       wherein the graphics data is copied into the working buffer just before the working buffer becomes the display buffer,
       wherein the first buffer sub-area, the second buffer sub-area, and the third buffer sub-area are distinct buffer sub-areas located in a graphics buffer region.

13. The apparatus of claim 12, wherein the third buffer sub-area comprises a plurality of icon buffer sub-areas.

14. The method of claim 13, wherein graphics data is stored in any one of the plurality of icon buffer sub-areas.

15. The method of claim 12, wherein interchanging the roles of the working buffer and the display buffer occurs at a specific time interval.

16. The method of claim 15, wherein the specific time interval is in the range of 5-10 seconds.

17. The apparatus of claim 12, wherein graphics data comprises icon data.

18. The apparatus of claim 12, wherein displaying the complete image comprises displaying graphics data over the subtitle data for overlapping portions of graphics data and subtitle data.

19. The apparatus of claim 12, wherein displaying the complete image comprises displaying non-overlapping portions of graphics data and subtitle data concurrently.

20. The apparatus of claim 12, wherein other received data to be displayed as the complete image is copied into the working buffer immediately after copying the graphics data into the working buffer.

21. The apparatus of claim 12, wherein the complete image comprises a graphics layer comprising the graphics data and the subtitle data, a stills data layer, a moving image data layer, and a cursor data layer.

22. A broadcast and reception system including a receiver/decoder according to claim 12, and means for broadcasting said data.

* * * * *